United States Patent [19]

Waine et al.

[11] 4,372,432

[45] Feb. 8, 1983

[54] BI-DIRECTIONAL CLUTCH

[75] Inventors: Martin Waine, Riverside; Jules Nisenson, Stamford, both of Conn.

[73] Assignee: General Clutch Corp., New York, N.Y.

[21] Appl. No.: 244,975

[22] Filed: Mar. 18, 1981

[51] Int. Cl.³ .................... F16D 67/00; B60T 7/12
[52] U.S. Cl. ........................ 192/8 C; 192/12 BA; 192/33 C; 192/41 S; 192/43
[58] Field of Search .............. 192/8 C, 26, 43, 41 S, 192/12 BA, 33 C, 14

[56] References Cited

U.S. PATENT DOCUMENTS

| Re. 16,565 | 3/1927 | Myers | 192/8 C |
|---|---|---|---|
| 823,971 | 6/1906 | Remondy | 192/8 C |
| 2,145,666 | 1/1939 | Roethel | 192/8 C |
| 3,135,369 | 6/1964 | Nisenson et al. | 192/8 C |
| 3,307,663 | 3/1967 | Luenberger | 192/8 C |
| 3,340,975 | 9/1967 | Erickson | 192/33 C |
| 3,477,486 | 11/1969 | Modrey | 192/43 X |
| 3,915,268 | 10/1975 | MacDonald | 192/12 BA |

*Primary Examiner*—George H. Krizmanich

*Attorney, Agent, or Firm*—Gottlieb, Rackman & Reisman

[57] ABSTRACT

There is disclosed a bi-directional clutch, particularly useful in window shade applications. The bi-directional clutch includes a first or core member and an unwrap spring, that is, a spring having an inside diameter somewhat smaller than the diameter of the core, the spring being wound around the core. The unwrap spring has a number of helical turns and spring tangs which extend outwardly past the circumference of the spring and generally perpendicular to the axis of the spring. The spring is controlled by a second, control or driving member which, when rotated, applies force to one or the other of the spring tangs to unwrap or loosen the spring, thereby allowing the spring to rotate relative to the core. As the spring rotates, one of the spring tangs abuts a third or driven member. The third or driven member is rotated by the spring, allowing the third member to rotate relative to the first or core member. The third or driven member continues to rotate, relative to the first or core member, until the second, control or driving member stops rotating. However, when the driven member is rotated directly, the spring is locked onto the core member and further rotation of the driven member is prevented.

13 Claims, 11 Drawing Figures

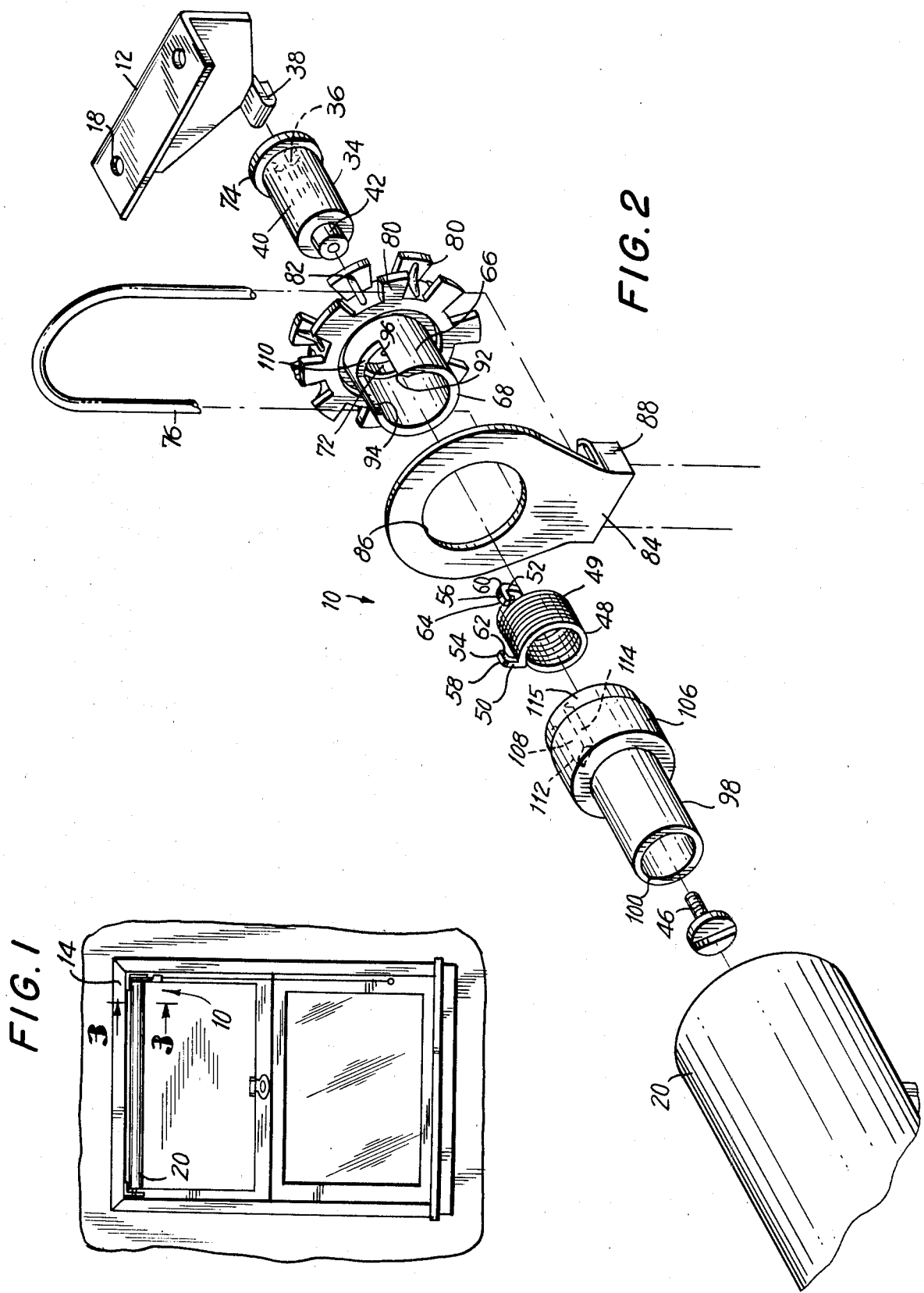

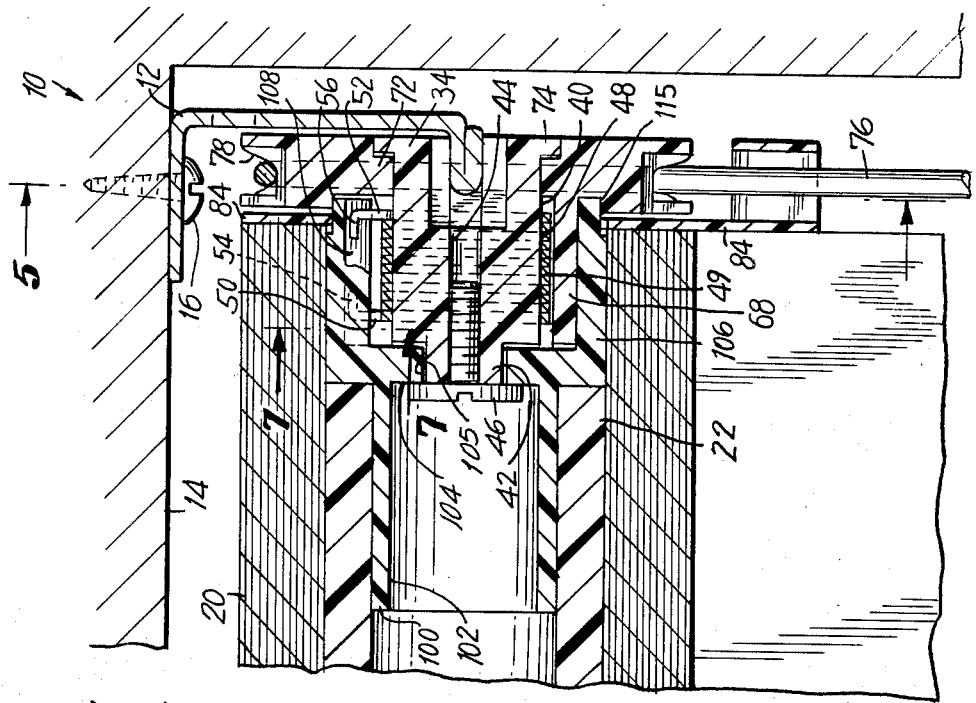
FIG. 4
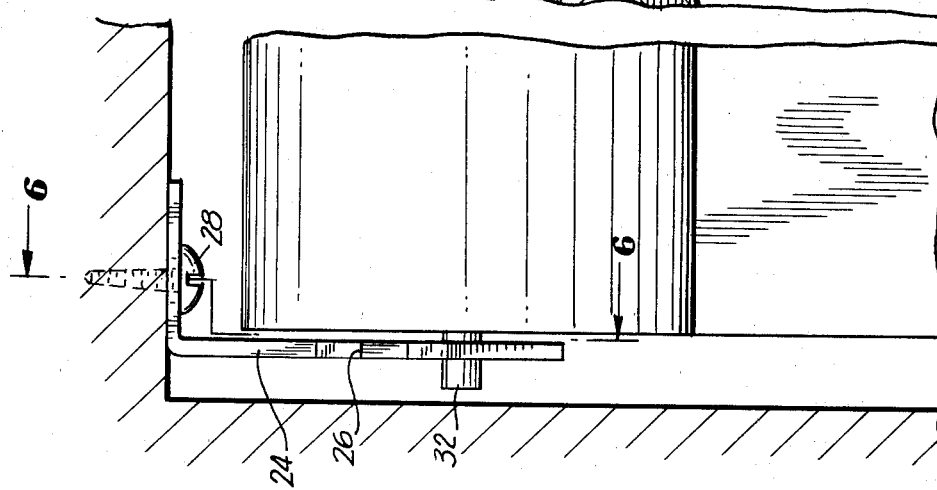
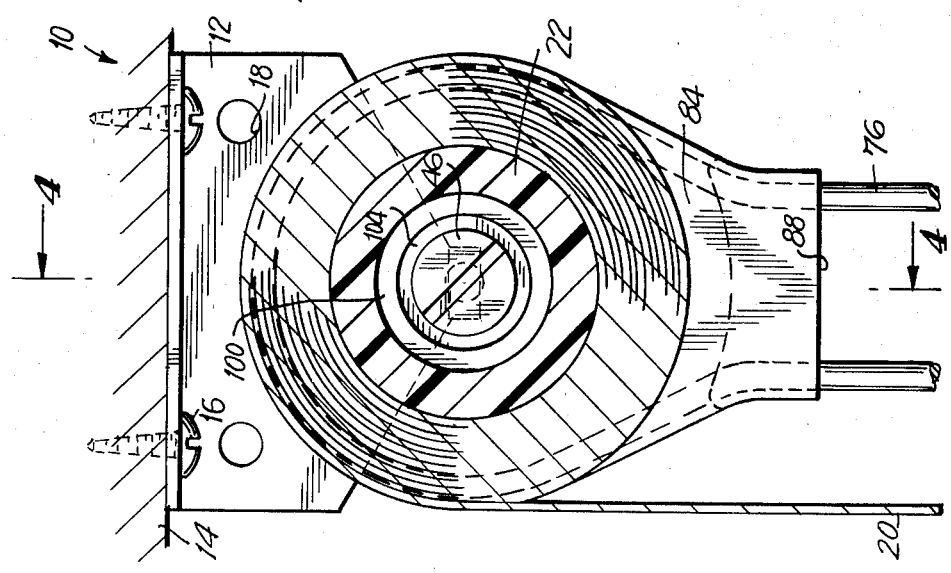
FIG. 3

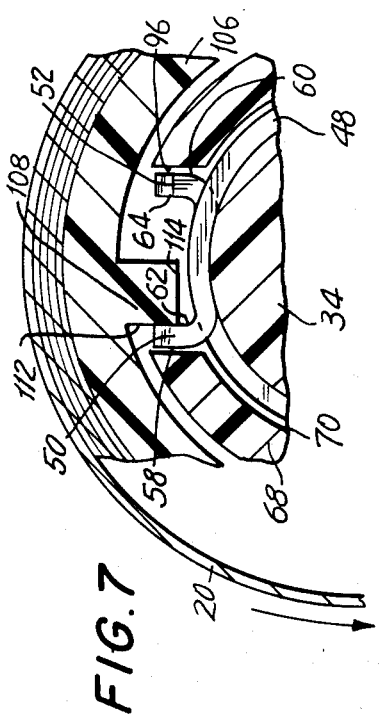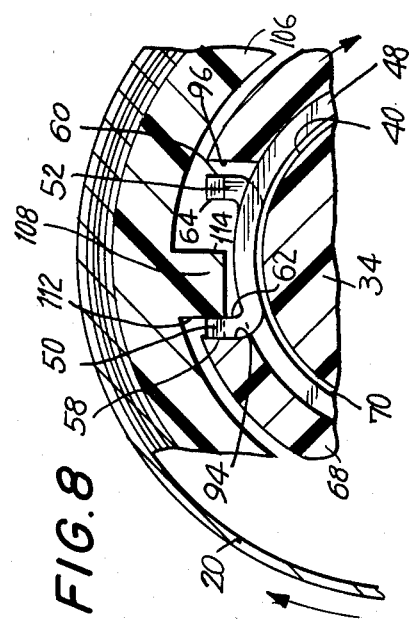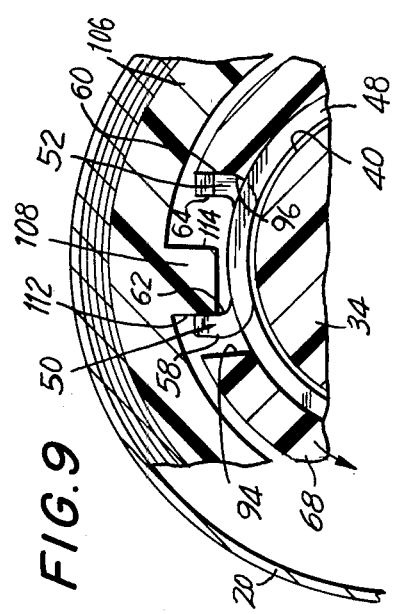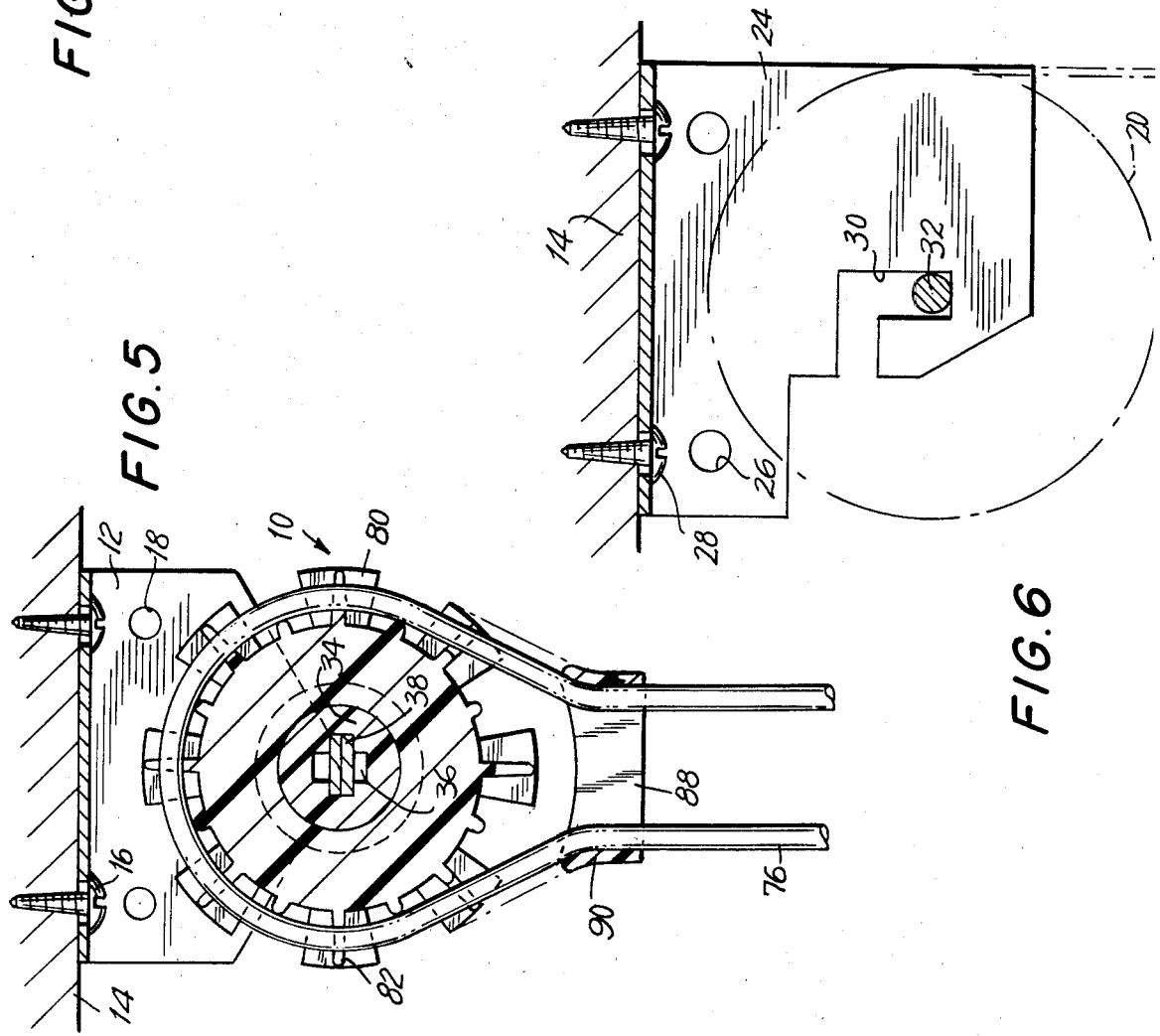

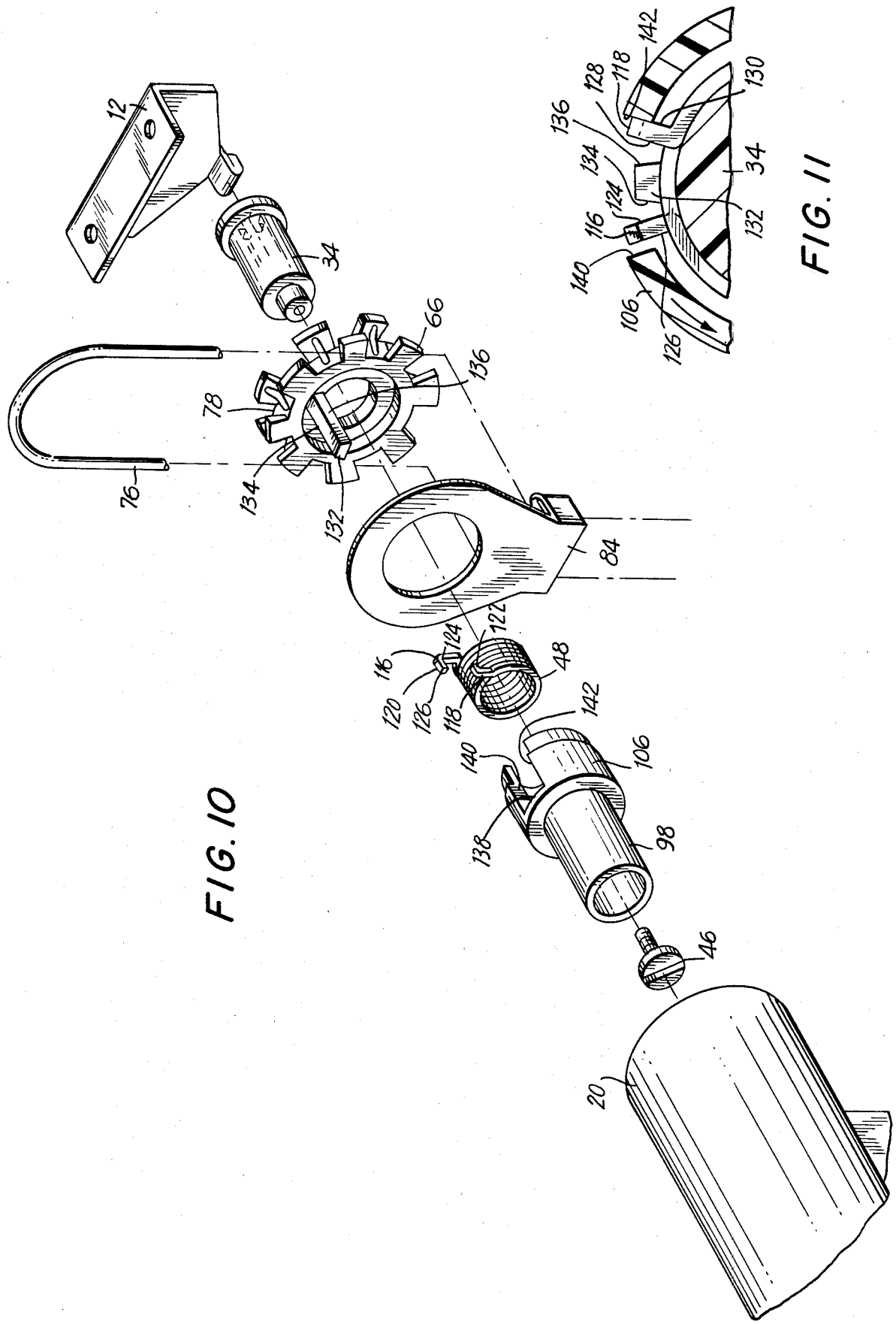

BI-DIRECTIONAL CLUTCH

This invention relates to bi-directional clutches and, more particularly, to such clutches which offer improved reliability and ease of manufacture.

There are numerous applications for bi-directional clutches. A typical bi-directional clutch includes a driving member and a driven member. When the clutch is engaged, a torque applied in either direction to the driving member causes it to turn, rotating the driven member along with it. But a torque applied directly to the driven member when the clutch is engaged, locks the driven member and does not result in either the driven or driving member turning. When the clutch is disengaged, a torque applied to the driving member will not cause the driven member to rotate and a torque applied to the driven member will not be transferred back to the driving member.

A typical application for such a bi-directional clutch is for use with window shades. In this application, the clutch is always engaged and the driven element is locked in place when the driving element is stationary. Such bi-directional clutches are a decided improvement over the more conventional ratchet and pawl, spring-loaded mechanisms. In this latter case, the shade is often difficult to position accurately and, moreover, once the shade has been used for any length of time, the mechanism frequently becomes dirty resulting in difficulty in engagement between the ratchet and pawl. This often results in the shade rewinding itself, requiring re-rolling of the shade or even replacement.

A bi-directional clutch has the advantage of overcoming the difficulty of ratchet and pawl, spring-loaded arrangements, such that there is no possibility of shade run-away. In a typical application for use with window shades, the bi-directional clutch may be used by attaching its driven member to a simple shade roller. The driving member may be provided with a cord loop for turning it in either direction. As the cord loop is pulled, torque is applied to the driving member, causing the driven member and shade roller to turn, and in this manner the shade can be raised or lowered. Once the shade position is adjusted, the weight of the shade tends to turn the driven roller directly. But the application of a direct torque to the driven member does not result in its turning, and the shade therefore remains in place. The only way to adjust the shade height is by applying a direct torque via the cord loop or chain to the driving member.

The type of bi-directional clutch toward which the present invention is directed is exemplified by U.S. Pat. No. 3,135,369, which issued on June 2, 1964. This patent discloses a bi-directional clutch having particular applicability to a window shade mechanism, and utilizes a spring to couple motion of the driving member to the driven member. This is accomplished by having one end of the spring pass through an arcuate slot in the driven member and by having the other spring end pass through a small opening in the driving member—the ends of the spring being in alignment with each other, being parallel to the spring axis and being within the circumference of the turns of the spring, that is, at the same radial distance from the spring axis as the turns of the spring. The driving member also has a projection or lug which fits into a second arcuate slot in the driven member. By moving the driving member, the spring is loosened, allowing ultimate movement of the driven member.

Although the bi-directional clutch mechanism disclosed in U.S. Pat. No. 3,135,369 operated satisfactorily in theory, it worked much less so in practice. To begin with, the bi-directional clutch mechanism utilized a relatively elaborate set of parts, requiring careful and precise positioning of slots, tabs and extra pieces. These parts were somewhat difficult to fabricate and also difficult to assemble, considerably increasing manufacturing costs. Furthermore, any deviation in tolerances was found to be critical to the operation of the device, poor tolerances adversely affecting the operation by preventing the mechanism from operating properly.

In U.S. Pat. No. 3,920,106, which issued on Nov. 18, 1975, there is disclosed a single revolution clutch having an input element with a U-shaped channel and an actuating sleeve element with a rib. The clutch uses a coil spring having longitudinal terminals which are in alignment with each other, parallel to the spring axis and within the circumference of the spring turns. These spring ends fit into actuating rings. In operation, the actuating sleeve turns with the input element for a single revolution and, when movement of the input element is arrested, the spring is opened to prevent further movement of an output sleeve upon which the spring is wound.

Once again, the clutch disclosed in U.S. Pat. No. 3,920,106 is somewhat difficult to fabricate, utilizes additional parts such as actuating rings and, as a single revolution clutch, has no applicability to window shade configurations.

Accordingly, it is a broad object of the present invention to provide an improved bi-directional clutch.

A more specific object of the present invention is to provide a bi-directional clutch particularly useful as part of a window shade mechanism used to raise or lower a window shade.

Yet another object of the invention is to provide a bi-directional clutch having improved manufacturing advantages by having fewer, less complex parts and by having a lesser need for precise tolerances than bi-directional clutches according to the prior art.

These and other objects of the present invention are obtained by providing a bi-directional clutch, particularly useful in a window shade mechanism, having a first core or spring-receiving member which, when the bi-directional clutch is used as part of a window shade, is held stationary by a bracket attached to a window frame. An unwrap spring, having end tangs extending outwardly past the circumference of the spring turns and being substantially perpendicular to the axis of the spring, is wrapped around the core member, such that the spring is normally held in place relative to the core. A second, control or driving member, which receives a shade cord or chain, acts as a spring-actuating element and has a tang-receiving surface adapted to abut one or the other of the spring tangs, depending on the rotation of the control or driving member, thereby loosening the spring and allowing it to move relative to the fixed core. The bi-directional clutch also includes, as part of its mechanism, a third or driven member which, when the device is used as part of a window shade configuration, has a window shade fixedly attached thereto. The third or driven member includes a tang-abutting surface, and as the spring is moved by the control or driving member relative to the stationary core, a tang of the spring hits the tang-abutting surface thereby moving the third or driven member.

According to a first embodiment of the invention, the spring is a crossed-over spring, the tang-receiving surface of the second, control or driving member is a U-shaped channel which is adapted to contact one or the other outer surfaces of the spring tangs, and the tang-abutting surface of the third or driven member is an inside rib on the driven member which abuts the inner surface of one or the other of the spring tangs.

In an alternative, second embodiment, the tangs of the spring are not crossed over, the tang-receiving surface of the second, control or driving member is a rib parallel to the axis of the spring and the tang-abutting surface of the third or driven member is a U-shaped channel. In this embodiment, the tang-receiving surface is located between the inner surfaces of the tangs and the tang-abutting surface is located between the outer surfaces of the tangs.

Further objects, features and advantages of the invention will become apparent upon consideration of the following detailed description of preferred, but nonetheless illustrative embodiments, when considered in conjunction with the following drawings, in which:

FIG. 1 depicts the application of the bi-directional clutch of the present invention to window shade hardware;

FIG. 2 is an exploded perspective view of the main elements of an illustrative embodiment of the invention;

FIG. 3 is a sectional view through the assembled bi-directional clutch, taken along the line 3—3 of FIG. 1;

FIG. 4 is a sectional view through line 4—4 of FIG. 3;

FIG. 5 is a sectional view through line 5—5 of FIG. 4;

FIG. 6 is a sectional view through line 6—6 of FIG. 4;

FIG. 7 is a partial sectional view through line 7—7 of FIG. 4 and showing the relative positions of the second, control or driving member, unwrap spring and third or driven member;

FIG. 8 is a sectional view, similar to that of FIG. 7, but showing the relative positions of the unwrap spring, third or driven member and second, control or driving member as a torque is applied to the driving member to raise the shade;

FIG. 9 is a sectional view, similar to that of FIG. 7, but showing the relative position of the unwrap spring, third or driven member and second, control or driving member as a torque is applied to the driving member to lower the shade;

FIG. 10 is an exploded perspective view of the main elements according to a second, alternative embodiment of the invention; and FIG. 11 is a schematic view somewhat similar to the view of FIG. 7, showing the relative relationship between the unwrap spring, driven and driving members according to the second embodiment of the invention.

Referring now to the drawings and, more particularly, to FIGS. 1-6 thereof, a bi-directional clutch according to one embodiment of the invention is generally designated 10. Although the bi-directional clutch has wide use in other arrangements, it finds particular applicability when used as part of a window shade configuration. In this context, the clutch 10 is mounted by a mounting bracket 12 to a window frame 14. By way of example, bracket 12 may be fastened to frame 14 by appropriate fastening elements, such as by mounting screws 16, which pass through openings 18 in the mounting bracket, thereby attaching the mounting bracket to the window frame 14. As shown in FIGS. 3–5, the bracket is attached to the underside of the window frame top. However, it is readily apparent that bracket 12 may be secured to the side of frame 14, if desired.

The bi-directional clutch 10 functions in this environment to control raising and lowering of a window shade 20, which is wound around a shade roller 22, the latter formed of carboard or some other material as is well known. The shade roller 22 extends between the sides of the window frame 14, and is mounted to the other side of the frame by another mounting bracket 24 of conventional design, having a series of openings 26 allowing the bracket to be attached by fastening elements, such as screws 28, either to the top of frame 14 or the side of frame 14, near the left hand corner of the window frame, as viewed in FIG. 1. The bracket 24 includes a slot 30 which receives and supports a pin 32 carried by the shade roller, thereby allowing the shade and shade roller to rotate relative to bracket 24.

The bi-directional clutch 10 includes a first or core member 34, one end of which has a bracket receiving slot 36 which receives a tab 38 of mounting bracket 12. In this manner, the bi-directional clutch is attached to the mounting bracket 12 and the core member 34 is held stationary to the bracket. By having tab 38 extend into the core member 34, the "gap" between the side of the shade and the window frame is kept to a minimum. This is especially so when a pulley mechanism is being used, since the tab and the pulley can occupy the same vertical space.

The core member 34 is of a generally cylindrical configuration, having a first spring-receiving cylindrical surface 40 and a second narrower cylindrical surface 42. The core 34 has a central bore 44 extending along the longitudinal axis of the core. This bore is preferably threaded and is adapted to receive a fastening element 46, in the form of a threaded screw, which is threaded into bore 44 from the left hand end of core 34 (see FIG. 4). Other techniques may be employed, however. For example, a drive screw could be used thereby eliminating the need to pre-thread the core.

The cylindrical surface 40 of the fixed core receives an unwrap spring 48 which has a series of helical turns 49 and which terminates in spring tangs 50 and 52. The tangs 50, 52 extend outwardly past the circumference of the spring turns and are generally perpendicular to the longitudinal axis of spring 48; that is, the tangs extend radially outward of the circumference of the helical turns. Each spring tang may have a respective tang extension 54 or 56 which is generally parallel to the axis of the spring. The tang extensions are provided, as will be explained, to provide extra surface area between each tang and the contacted surfaces of the driving and driven members of the bi-directional clutch assembly. This reduces distortion of the softer materials used in the fabrication of the driving and driven members.

As noted, spring 48 is an unwrap spring, that is, the inside diameter of the spring is somewhat smaller than the outer diameter of cylindrical surface 40 of core 34. In this manner, the spring 48 normally "grips" the cylindrical surface 40 and the spring is held in place relative to the stationary core 34. However, as will be explained, force applied in the appropriate direction to either spring tang 50 or spring tang 52 tends to unwind the helical turns, thereby loosening or ungripping the helical turns of the spring from the spring-receiving cylindrical surface 40 and allowing the spring 48 to turn relative to core 34.

In particular and referring generally to FIG. 2, a force applied to the outer or second surface 58 of tang 50 tends to cause the tang to move in the clockwise direction (when viewed from the left in FIG. 2) thereby expanding the helical turns 49 of spring 48 and allowing the spring to move relative to core 34. In a similar fashion, a force applied to the outer or second surface 60 of tang 52 causes this tang to move in the counterclockwise direction (when viewed from the left of FIG. 2), also causing the spring to unwind slightly by increasing the inner diameter of the helical turns and allowing the spring to move relative to the core.

On the other hand, a force applied to the inner or first surface 62 of tang 50 or to the inner or first surface 64 of tang 52 tends to cause the respective tangs to move in the opposite directions, tightening the spring around the cylindrical surface 40 of core 34 by applying a force which tends to cause the helical turns to grip or tighten about this spring-receiving surface. By controlling the force applied to spring tangs 50 or 52, the spring is either loosened (thereby allowing turning of the spring relative to core 34) or tightened about core 34. In this manner, the bi-directional clutch 10 functions either to transmit motion from the driving to driven member to allow shade 20 to be raised or lowered, or to act as a lock for the shade.

It should be noted that in this embodiment, unwrap spring 48 has tangs which are "crossed-over"; when viewed from the left hand side in FIG. 2, tang 50 is to the left of tang 52 (see also FIGS. 7-9). In other words, the distance from one spring tang to the other in helical turns is an integer plus less than one-half turn. This is to be contrasted to the second embodiment of the invention, wherein the tangs are not crossed-over.

In order to move the appropriate tangs 50 or 52, the bi-directional clutch 10 includes a second, control or driving member 66 which functions as a spring-actuating member. The control or driving member includes a hollow cylindrical sleeve portion 68 having an inner diameter of a size which allows the sleeve to fit over the helical turns of unwrap spring 48. In particular, the inner diameter of the cylindrical sleeve portion 68 should be large enough to allow some clearance 70 (see FIGS. 7 and 8) between the helical turns of the spring and the inner surface of the cylindrical sleeve portion, thereby allowing the spring to expand a sufficient amount to permit its movement relative to the core and so prevent the spring from hitting the inner wall of the sleeve.

The cylindrical sleeve portion 68 also includes a cylindrical inner ring 72 (see FIG. 2) which is located near the right hand end of sleeve 68. The inner ring 72 allows the control or driving member 66 to rotate about stationary core 34, the ring 72 rotatably engaging the cylindrical surface 40 of the core, as best shown in FIG. 4. The core 34 advantageously includes a shoulder 74 which abuts one side of the inner ring 72 in order to prevent the control or driving member 66 from sliding off the stationary core member 34.

The second, control or driving member 66 is rotated, when the bi-directional clutch is used to control a window shade, by the application of torque applied to this member by a cord or chain 76 received within a cord channel 78, the latter extending outwardly from the cylindrical sleeve portion 68 of control or driving member 66. As illustrated particularly in FIG. 2 and FIG. 5, the cord channel is formed by a series of off-set radially extending projections 80, each of which advantageously includes an L-shaped rib 82 which extends inwardly from the channel projection into the path of cord 76 or, if a bead chain is used, between the heads of the chain. The spacing and size of the L-shaped ribs are chosen so that the chain fits within the perimeter of the pulley and there is clearance to allow for some variability of the spacing of the beads on the chain. The L-shaped rib on the channel projections 80 is provided to prevent slippage of the cord 76 within the cord channel 78, so that when the cord is pulled the force applied to the cord is translated into a torque which turns the control or driving member 66.

When the bi-directional clutch is used as part of a window shade mechanism, a cord guide 84 is also provided. The cord guide is formed to include an aperture 86 which allows the cord guide to be placed on the cylindrical portion 115 of the third or driven member 98 described hereafter. Aperture 86 is large enough to allow the cord guide to remain stationary in the orientation shown in FIG. 2, even though the driven member 98 is rotated. The bottom end of cord guide 84 provides a cord guideway 88, formed by bent flanges 90 through which cord 76 passes. The cord guideway 88 helps position cord 76 and keeps the cord within cord channel 78, thereby enabling the cord to be readily pulled by a user in order to raise or lower window shade 20.

The cylindrical sleeve portion 68 of the second, control or driving member is formed to include a U-shaped channel 92 which defines two generally parallel tang-receiving surfaces 94, 96. As torque is applied to the control or driving member 66 by a user pulling on cord 76, the control or driving member is rotated and, depending on the direction of rotation, either tang-receiving surface 94 hits the outer surface 58 of tang 50 or tang-receiving surface 96 hits the outer surface 60 of tang 52, thereby loosening the unwrap spring 48 and allowing it to turn relative to the core 34.

As spring 48 is turned relative to the stationary core 34, the spring transmits motion from the control or driving member 66 to a third or driven member, designated by the reference numeral 98. As illustrated particularly in FIG. 2 and FIG. 4, the third or driven member 98 includes a cylindrical sleeve 100 having a bore 102 which extends from the left hand end of the driven member. The bore 102 terminates in an inwardly extending ring 104 having a cylindrical surface 105 adapted to ride on the cylindrical surface 42 of stationary core 34 (see FIG. 4). This guides the driven member 98 as it turns about the stationary core 34.

The third or driven member 98 also includes sleeve portion 106 having an inner diameter sized to enable this part of the third or driven member 98 to slip over the cylindrical sleeve portion 68 of the control or driving member 66, as generally indicated in FIG. 4 and FIGS. 7-9. The sleeve portion 106 includes a rib 108, which extends inwardly from sleeve portion 106, as also shown in FIGS. 4 and 7-9. The rib 108 extends inwardly from the sleeve portion 106 a distance sufficient for the rib to intercept the clockwise or counterclockwise rotation of the spring tangs 50, 52, but it does not interfere with the expansion of the helical turns 49 of the unwrap spring. Rib 108 is also sized to extend within the U-shaped channel 98 of the second, control or driving member 66, the rib terminating before it hits the surface 110 which extends between the tang-receiving surfaces 94 and 96 of the U-shaped channel.

As illustrated in FIGS. 2 and 7-9, the rib 108 of the third or driven member 98 defines a first tang-abutting surface 112 and a second tang-abutting surface 114, which are provided to be abutted by the inner surface of the tangs 50 and 52. This enables the spring 48 to transfer motion from the second, control or driving member 66 to the third or driven member 98 when torque is applied to the driving member or, when torque is applied directly to the driven member 98, to lock to the driven member in place.

Before describing the operation or interaction of the various component parts of the bi-directional clutch, the manner in which the bi-directional clutch is assembled will be described.

In a typical assembly sequence, the second, control or driving member 66 is placed on the first or core member 34, with the control or driving member slipping over the cylindrical surface 40 of the core until the inner ring 72 of the control or driving member hits the shoulder 74 of the core.

The unwrap spring 48 is then placed about the cylindrical surface 40 of the core, the helical turns 49 of the spring having to be expanded slightly (by pinching the tangs 50, 52 toward each other), since the inner diameter of the helical turns 49 is smaller than the diameter of this cylindrical surface. The spring is positioned on cylindrical surface 40 with the tangs 50 and 52 disposed within the U-shaped channel 92 of the control or driving member 66. Next, the cord guide 84 is positioned against the cord channel 78, as shown in FIG. 4.

The third or driven member 98 is then slipped over the cylindrical sleeve portion 68 of the control or driving member, the rib 108 on the inside of the driven member being located between the tangs 50 and 52, and the cord guide 84 resting on the cylindrical portion 115 of the driven member.

The various elements are kept in place by threaded screw 46 which is tightened within bore 44 sufficiently to hold the various members in place. The free relative rotations of the core 34, control or driving member 66, and third or driven member 98 are provided by making the length of cylindrical portion 42 of the core slightly longer than the width of cylindrical surface 105 of the driven member.

The shade roller 22, carrying with it window shade 20, is then placed over the cylindrical sleeve 100 of the third or driven member, the shade roller being sized to provide a tight friction fit between the driven member and the roller, so that as the driven member turns it carries the shade roller 22 and shade 20 with it. If desired, the shade roller 22 may be cemented or otherwise secured to the sleeve 100. Where rollers with larger inside diameters are used, molded or fiber bushings (not shown) of a cylindrical shape may be used to secure the clutch assembly to the shade roller. It should also be noted that the window shade 20 may desirably be somewhat longer than the shade roller 22, so that the shade extends to the cord guide 84 (see FIG. 4). This allows the shade 20 to extend substantially across the full extent of the window.

The bi-directional clutch functions, when used in a window shade environment, such that torque applied to rotate the second, control or driving member 66 (the torque being applied by the user pulling on shade cord 76), either raises or lowers the window shade 20, by allowing the unwrap spring 48 to transmit the motion of the driving member to the third or driven member 98. On the other hand, torque applied directly to the third or driven member 98, for example, either by the user "tugging" on the window shade or by the weight of the shade itself, does not turn the driven member and the shade is therefore maintained in position.

Thus, and as will be explained further by reference to the operation of the bi-directional clutch, the first or core member 34 functions as a spring-receiving member, the second or control or driving member 66 functions as a spring-actuating member and the third or driven member 98 functions as a spring-actuated member, the latter disposed for rotation with spring 48. If the spring rotates relative to the core member, the driven member also rotates relative to the core; but if the spring is locked in place relative to the core, so is the driven member. Since rotation of the spring relative to the core member is controlled by the spring-actuating driving member, this means that only driving member-controlled rotation of the spring transfers rotation to the driven member.

The operation of the bi-directional clutch will be further apparent by particular reference to FIGS. 7-9. FIG. 7 illustrates the relative positions of cylindrical sleeve portion 68 of the second, control or driving member 66, the unwrap spring 48, and the sleeve portion 106 of the third or driven member 98 as a force is applied directly to the shade 20 in the direction of the arrow. This force is applied either by a user pulling on the shade or, more probably, by the weight of the shade itself. In this situation, the force on the shade tends to rotate the sleeve portion 106 (and rib 108) of the driven member in a counterclockwise direction (when viewed in FIG. 7). The rib 108 and sleeve portion 106 move in this direction until the tang-abutting surface 112 of the rib 108 hits the inner or first surface 62 of tang 50. But a force applied to tang 50 in this direction, i.e., a force applied to the inside surface of the tang, causes the helical turns 49 of spring 48 to tighten about stationary core 34. Accordingly, as rib 108 reaches tang 50, rotation of the driven member in the counterclockwise direction stops and the driven member is held in place by the spring—preventing movement of shade 20. (This is consistent with the aforesaid explanation that any torque applied directly to the third or driven member merely locks the member in place and does not allow relative rotation between the driven member and the driving member or between the driven member and core 34.)

When it is desired to raise the shade 20, the shade cord 76 is pulled in a direction to cause cylindrical sleeve portion 68 of the control or driving member to rotate in a clockwise direction, indicated by the arrow in FIG. 8. This movement causes the tang-receiving surface 94 of the U-shaped channel to hit the outer or second surface 58 of tang 50. But a force applied to the outside surface of this tang loosens the spring, allowing the spring 48 to rotate relative to core 34 in a clockwise direction (as viewed in FIG. 8). As the spring rotates in this direction, the inner surface 62 of tang 50 hits the tang-abutting surface 112 of rib 108, thereby turning the driven element 98 in the same clockwise direction to raise shade 20. The shade continues to be raised as long as the torque applied to the driving member 66 rotates it in the clockwise direction—driving member-controlled rotation of the spring tang 50 functioning to transmit motion from the driving member 66 to the driven member 98.

It will be appreciated that the distance between the tang-receiving surfaces 94 and 96 of the U-shaped channel 92 should be somewhat greater than the distance between tang surfaces 58 and 60 when the spring is tightly wound around surface 40 of core 34 to enable tang 50 to move toward tang 52, thereby loosening the spring around core 34, without surface 60 hitting surface 96, as the driving member is rotated. Furthermore, the width of rib 108, i.e., the distance between the tang-abutting surfaces 112 and 114, should be narrow enough such that as tang 50 moves the rib, the rib does not hit tang 52 (see FIG. 8—tang-abutting surface 114 of rib 108 must not interfere with tang 52 as tang 50 moves the rib in the clockwise direction).

If the third or driven member 98 did not support a load tending to rotate the driven member in a counterclockwise direction, then a torque applied to the control or driving member 66 in the counterclockwise direction would merely reverse the relative rotation of the tangs, driving and driven members. In other words and referring to FIG. 8, the tang-receiving surface 96 of the control or driving member would be caused to bear against the outer or second surface 60 of tang 52, causing this tang to move in a counterclockwise direction; the inner or first surface 64 of the tang would then hit the tang-abutting surface 114 of rib 108, causing the third or driven member 98 to also rotate in the counterclockwise direction; and the spring, driving and driven members would all be rotated counterclockwise.

However, when the bi-directional clutch is used in a shade environment (or when a load is applied to the driven member tending to cause it to rotate counterclockwise), the weight of the shade must be taken into account as torque is applied to the control or driving member to lower the shade. This situation is illustrated in FIG. 9 which shows that a force has been applied to the control or driving member 66 causing the cylindrical sleeve portion 68 to move in the counterclockwise direction, as indicated by the arrow. Such rotation causes the tang-receiving surface 96 to move counterclockwise hitting the outside surface 60 of spring tang 52. This expands the helical turns 49 of the spring, allowing the spring to move relative to core 34 in the counterclockwise direction. However, and in contrast to the operation in raising the spring discussed as to FIG. 8, the weight of the shade (or other similar load applied to the driven member 98), causes the tang-abutting surface 112 of rib 108 to continue resting against the inner surface 62 of tang 50 since the shade weight is exerting a counterclockwise rotational force to the driven member 98. At constant angular velocity, tang 50 continues to exert a force on the rib 108 producing a torque equal to the torque produced by the weight of the shade to be supported less any effects due to frictional forces, as spring 48 rotates counterclockwise. There is therefore no need for the inner surface 64 of tang 52 to move rib 108 in the counterclockwise direction to rotate driven member 98. Rather, the weight of the shade itself will cause a counterclockwise rotation to allow the shade to be pulled down as the torque is applied to control or driving member 66 in the counterclockwise direction. The mechanism thereby allows controlled descent of shade 20, the tang 50 exerting a braking force on rotation of the driven member. Of course, if shade 20 is extremely light (or if it is rolled all the way onto shade roller 22), the weight of the shade is not a factor and the lowering of the shade is substantially the reverse of raising the shade, discussed with respect to FIG. 8.

In order to assure smooth operation of the clutch when lowering the shade, it is important (referring to FIG. 9), that the outside surface 60 of tang 52 remains in contact with the tang-receiving surface 96 of the control or driving member. If the weight of the shade can move the spring away from the tang-receiving surface, then the clutch will disengage and inhibit further motion of the shade until surface 96 again comes in contact with the tang and again releases the spring. This will cause a "jerky" motion of the shade which is undesirable.

This separation and resulting jerky motion, can be prevented by insuring that the spring grips the core immediately upon the release of pressure from the control or driving member. Factors affecting this include:

(1) the number of turns in the spring;
(2) the stiffness of the spring wire;
(3) the coefficient of friction between the spring and core material; and
(4) the size interference between the inside diameter of the spring and the spring-receiving surface 34 of the core.

Various combinations of the above factors will work satisfactorily, but in general, if the clutch is too free, it will jerk when being released under load, so a "trade off" must be made between load capacity and ease of operation. When the clutch is disengaged, that is, when the control or driven member is not in contact with either spring tang, the load is entirely supported by the spring tang which is in contact with the driven member. If this load is too great, the spring tang will deform or break off. An additional benefit can be obtained by adjusting the factors mentioned above so that the clutch will intentionally slip at a load smaller than that required to damage the spring tangs.

It should be noted that dynamic loads encountered when the shade is raised do not hold the same danger for breaking or deformation of the spring tangs, since the tang is merely interposed between the spring receiving surface of the control or driving member, and the spring abutting surface of the driven member.

The material used for the core is preferably a glass reinforced plastic which gives good wear and relatively consistent friction against the music wire spring. For longer wear, a powdered metal core material which is hardened and oil impregnated can be used, although the cost is greater than that of the reinforced plastic.

An alternate, second embodiment of the invention is illustrated in FIGS. 10 and 11. Once again, the clutch includes a first or spring-receiving core 34 held stationary to a mounting bracket 12. The core 34 receives an unwrap spring 48 and a second spring actuating control or driving member 66. When the bi-directional clutch is utilized in a window shade environment, the control or driving member 66 receives a cord 76 which travels within a cord channel 78 formed as part of the control or driving motor. A cord guide 84 is also provided to help direct the travel of the cord 76. Depending on the force applied to cord 76, a torque is applied to the control or driving member 66 to rotate third spring-actuated or driven member 98, thereby raising or lowering shade 20, the motion of the driving member being translated to the driven member by unwrap spring 48. A threaded screw 46 maintains the various parts of the bi-directional clutch assembly in place.

The second embodiment differs from the embodiment of the invention shown in FIGS. 2, 4 and 7-9, in certain structural features of unwrap spring 48, control or driving member 66 and third or driven member 98. In particular, the unwrap spring 48 is an "uncrossed" spring having spring tangs 116, 118 which extend radially outward past the cylindrical circumference of the helical spring turns. Tang 116 includes a tang extension 120 which extends parallel to the axis of the spring and tang 118 includes a tang extension 122 which also extends parallel to the longitudinal spring axis. Tang 116 and its extension define an inner or second tang surface 124 and an outer or first tang surface 126; tang 118 and its tang extension define an inner or second tang surface 128 and an outer or first tang surface 130. In this embodiment, the unwrap spring has tangs which are uncrossed; when viewed from the left in FIG. 10 and as indicated in FIG. 11, tang 116 is to the left of tang 118. In other words, the distance from one spring tang to the other in helical turns is an integer plus more than one-half turn.

In contrast to the first embodiment, the control or driving member 66 now includes a rib element 132, which is adapted to fit between the two tangs 116, 118, the rib defining tang-receiving surfaces 134 and 136. Tang-receiving surface 134 is adapted to hit the inner surface 124 of tang 116 and tang-receiving surface 136 is adapted to hit the inner surface 128 of tang 118. Furthermore, the third or driven member 98 now includes a U-shaped channel 138 located in the sleeve portion 106 of this member. The U-shaped channel has a tang-abutting surface 140 which is adapted to abut the outer surface 126 of tang 116 and a tang-abutting surface 142 which is adapted to hit the outer surface 130 of tang 118 (see FIG. 11).

In operation, a torque applied to control element 66 rotates this member in either the clockwise or counterclockwise direction relative to stationary core 34. If the control or driving member is moved clockwise, rib 132 eventually hits the inner surface of tang 118, causing the spring to unwrap and move clockwise. The outside surface 130 of this tang then hits the tang-abutting surface 142 of the driven member, and this causes the driven member to likewise move in the clockwise direction to raise the shade. When no rotational force is applied to the driving member, the weight of the shade tends to cause the driven member to rotate counterclockwise, as indicated by the arrow in FIG. 11, but no substantial movement of the shade occurs since tang-abutting surface 142 of the driven member hits the outer surface 130 of tang 118, thereby locking the spring in place and preventing further counterclockwise rotation of the driven member.

In lowering the shade, the torque applied to the driving member 66 causes the rib 132 to move counterclockwise, the tang-receiving surface 134 of the rib hits the inner surface 124 of tang 116 and spring 48 is loosened and is rotated counterclockwise as the driving member continues to turn counterclockwise. The shade is lowered since the driven member also moves in the counterclockwise direction, but the shade moves in a controlled manner since the tang-abutting surface 142 rests against the outer surface of tang 118—this tang thereby providing a braking action which allows the shade to be lowered in a controlled or non-runaway manner.

As with the first embodiment, rotation of the driving member in either direction loosens the spring and motion is transferred to the driven member; similarly, direct rotation of the driven member in either direction tightens the spring and locks the driven member.

It will be appreciated that the present invention provides an improved bi-directional clutch which may be formed of a relativley few number of pieces and which has tolerances which can easily be achieved in the manufacturing process and maintained while the clutch is in use. By utilizing a rib and a U-shaped channel, either as part of the control or driving member or the driven member, and by utilizing an unwrap spring having tangs which extend outwardly past the circumference of the turns of the spring, problems with tolerances and increased manufacturing costs due to complicated parts are substantially reduced, if not eliminated. Thus by utilizing such an unwrap spring, problems in aligning the ends of the spring or in fitting the spring into slots or other apertures are eliminated. Moreover, by forming the spring tangs with tang-extensions, the surface area of the tangs is increased in the area where the tangs hit either the control or driving member or the driven member, and this reduces the pressure of the tangs on the tang-abutting and tang-receiving surfaces and enables the spring to efficiently transmit motion from the driving member to the driven member or to lock the driven member in place, as the case may be.

It will also be appreciated that numerous modifications may be possible in light of the above teachings. For example, the core member could be disposed around the outside of the unwrap spring such that the spring normally grips the "core" (the tangs of the spring extending radially inward from the helical turns) and the control member could cause the spring to contract thereby allowing the spring to rotate relative to the core to transfer motion to the driven member.

Accordingly, the above description is by way of example only, and modifications, changes and the like are contemplated within the scope of the invention which is set forth in the following claims.

What we claim is:

1. A bi-directional clutch comprising a core member having a cylindrical surface; an unwrap spring having helical turns, said helical turns being located about the cylindrical surface of the core member and normally gripping the cylindrical surface of the core member to prevent rotation of the spring relative to the core member; said unwrap spring further including a first spring tang and a second spring tang, said spring tangs extending outwardly past the circumference of the helical turns and being responsive to a force applied to the first spring tang in a first direction to cause the helical turns to tighten about the core member and to a force applied to the frst spring tang in a second direction to cause the helical turns to loosen about the core member enabling the spring to rotate relative to the core member, and being further responsive to a force applied to the second spring tang in said first direction to cause the helical turns to loosen about the core member enabling the spring to rotate relative to the core member and to a force applied to the second spring tang in said second direction to cause the helical turns to tighten about the core member; a driving member disposed for rotation about the core member, said driving member having two tang-receiving surfaces, one of said tang-receiving surfaces being located such that rotation of the driving member relative to the core member in said second direction causes said one tang-receiving surface to apply a force to said first spring tang in said second direction to loosen said helical turns, the other of said tang-receiving surfaces being located such that rotation of the driving member relative to the core member in said first direction causes said other tang-receiving surface to apply a force to said second spring tang in said first direction to loosen the helical turns; and a driven member disposed for rotation with said spring, said driven member having two tang-abutting surfaces, one of said tang-abutting surfaces being located such that direct rotation of the driven member in said first direction causes the tang-abutting surface to apply a force to the first tang in said first direction to tighten the helical turns and prevent further rotation of the driven member and spring relative to the core member, the other of said tang-abutting surfaces being located such that direct rotation of the driven member in said second direction causes the tang-abutting surface to apply a force to the second tang in said second direction to tighten the helical turns and prevent further rotation of the driven member and spring relative to the core member, said tang-abutting surfaces being further operative to transfer driving member-controlled rotation of the spring relative to the core member to the driven member.

2. A bi-directional clutch according to claim 1 wherein the driving member includes a cylindrical sleeve with a U-shaped channel having said tang-receiving surfaces.

3. A bi-directional clutch according to claim 2 wherein the driven member includes a cylindrical sleeve with a rib extending inwardly therefrom having said tang-abutting surfaces.

4. A bi-directional clutch according to claim 3 wherein said spring tangs extend radially outward of the circumference of said helical turns.

5. A bi-directional clutch according to claim 4 wherein each spring tang further includes a tang extension extending parallel with the longitudinal axis of the spring.

6. A bi-directional clutch according to claim 1 wherein the driving member includes a rib having said tang-receiving surfaces disposed between said spring tangs.

7. A bi-directional clutch according to claim 6 wherein the driven member includes a cylindrical sleeve with a U-shaped channel having the tang-abutting surfaces.

8. A bi-directional clutch according to claim 7 wherein said spring tangs extend radially outward of the circumference of said helical turns.

9. A bi-directional clutch according to claim 8 wherein each spring tang further includes a tang extension extending parallel with the longitudinal axis of the spring.

10. A bi-directional clutch comprising a core member having a cylindrical surface; an unwrap spring having helical turns, said helical turns being located about the cylindrical surface of the core member; said unwrap spring further including two spring tangs, each spring tang extending radially outward of the helical turns and including a tang extension extending parallel with the longitudinal axis of the spring, each of said spring tangs and its tang extension having a first tang surface and a second tang surface and being responsive to a force applied to said first surface to tighten the helical turns on said core member and to a force applied to said second tang surface to loosen the helical turns on said core member; a driving member disposed for rotation about the core member and having two tang-receiving surfaces for applying forces to the second surfaces of respective ones of said two tangs to loosen the helical turns when the driving member is turned in either direction; and a driven member disposed for rotation about said driving member, said driven member having two tang-abutting surfaces for applying forces to the first surfaces of respective ones of said two tangs to tighten the helical turns when the driven member is turned directly in either direction.

11. A bi-directional clutch according to claim 10 wherein said spring is further operative when rotated relative to the core member to turn said driven member.

12. A bi-directional clutch comprising a first member having a spring-receiving surface; a spring having helical turns, said helical turns normally engaging the spring-receiving surface of the first member to prevent rotation of the spring relative to the first member; said spring further including a first spring tang and a second spring tang, said spring tangs extending outwardly past the circumference of the helical turns and being responsive to a force applied to the first spring tang in a first direction to cause the helical turns to grip the spring-receiving surface and to a force applied to the first spring tang in a second direction to cause the helical turns to ungrip the spring-receiving surface enabling the spring to rotate relative to the first member, and being first responsive to a force applied to the second spring tang in said first direction to cause the helical turns to ungrip the spring-receiving surface enabling the spring to rotate relative to the first member and to a force applied to the second spring tang in said second direction to cause the helical turns to grip the spring-receiving surface; a second member disposed for rotation about the first member, said second member having two tang-receiving surfaces, one of said tang-receiving surfaces being located such that rotation of the second member relative to the first member in said second direction causes said one tang-receiving surface to apply a force to said first spring tang in said second direction to ungrip said helical turns from the spring-receiving surface, the other of said tang-receiving surfaces being located such that rotation of the second member relative to the first member in said first direction causes said other tang-receiving surface to apply a force to said second spring tang in said first direction to ungrip said helical turns from the spring-receiving surface; and a third member, said third member having two tang-abutting surfaces, one of said tang-abutting surfaces being located such that direct rotation of the third member in said first direction causes the tang-abutting surface to apply a force to the first tang in said first direction to cause the helical turns to grip the spring-receiving surface preventing further rotation of the third member relative to the first member, the other of said tang-abutting surfaces being located such that direct rotation of the third member in said second direction causes the tang-abutting surface to apply a force to the second tang in said second direction to cause the helical turns to grip the spring-receiving surface preventing further rotation of the third member relative to the first member, said tang-abutting surfaces being further operative to transfer second member-controlled rotation relative to the first member to the third member.

13. A bi-directional clutch comprising a first member having a spring-receiving surface; a spring having helical turns, said helical turns being located to grip and ungrip the spring-receiving surface of the first member; said spring further including two spring tangs, each spring tang extending radially of the helical turns, each said spring tangs having a first tang surface and a second tang surface and being responsive to a force applied to said first tang surface to cause the helical turns to grip the spring-receiving surface of the first member and to a force applied to said second tang surface to cause the helical turns to ungrip the spring-receiving surface of the first member; a second spring actuating member disposed for rotation about the first member and having two tang-receiving surfaces for applying forces to the second surfaces of respective ones of said two tangs to cause the helical turns to ungrip the spring receiving surface of the first member when the second member is turned in either direction; and a third member disposed for rotation about said second member, said third member having two tang-abutting surfaces for applying forces to the first surfaces of respective ones of said two tangs to cause the helical turns to grip the spring-receiving surface of the first member when said third member is turned directly in either direction.

* * * * *